US006271286B1

(12) United States Patent
Leidner et al.

(10) Patent No.: US 6,271,286 B1
(45) Date of Patent: Aug. 7, 2001

(54) ERASABLE COLORED PENCIL LEAD

(75) Inventors: Jacob Leidner; David Hacker, both of Toronto (CA)

(73) Assignee: Binney & Smith Inc., Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/338,181

(22) Filed: Jun. 22, 1999

Related U.S. Application Data

(63) Continuation-in-part of application No. 09/197,283, filed on Nov. 20, 1998, which is a continuation-in-part of application No. 09/105,704, filed on Jun. 26, 1998, now Pat. No. 6,011,084.

(51) Int. Cl.$^7$ ............................ C09D 13/00; C08L 27/18; C08K 7/02
(52) U.S. Cl. ........................... 523/164; 524/520; 524/546
(58) Field of Search ......................... 523/164; 106/31.11, 106/31.12; 524/520, 546

(56) References Cited

U.S. PATENT DOCUMENTS

| | | |
|---|---|---|
| 257,706 | 5/1882 | Horne . |
| 328,366 | 10/1885 | Walpuski . |
| 471,438 | 3/1892 | Schwarzwald . |
| 566,845 | 9/1896 | Cross . |
| 1,502,763 | 7/1924 | Bugbee . |
| 2,220,992 | 11/1940 | Chesler . |
| 2,280,988 | 4/1942 | Weiser . |
| 2,338,176 | 1/1944 | Goepfert . |
| 3,409,574 | 11/1968 | Gros ...................................... 260/23 |
| 3,702,314 | 11/1972 | Farjon et al. ...................... 260/23 H |
| 3,821,157 | 6/1974 | Muller et al. . |
| 3,834,910 | 9/1974 | Mukai et al. . |
| 3,843,570 | 10/1974 | Murayama . |
| 3,849,394 | 11/1974 | Roueche et al. . |
| 3,976,488 | 8/1976 | Nihyakumen et al. . |
| 4,017,451 | 4/1977 | Ishida et al. . |
| 4,030,934 | 6/1977 | Iijima . |
| 4,209,332 | 6/1980 | Tsujio . |
| 4,229,334 | 10/1980 | Klabacka et al. .................. 260/28.5 |
| 4,298,507 | 11/1981 | Leon . |
| 4,371,632 | * 2/1983 | Grossman et al. .................... 523/164 |
| 4,388,396 | 6/1983 | Nishibayashi et al. .............. 430/126 |
| 4,430,468 | 2/1984 | Schumacher ........................ 524/109 |
| 4,548,960 | 10/1985 | Bentley . |
| 4,647,602 | 3/1987 | Wilczak et al. . |
| 4,668,572 | 5/1987 | Iizuka et al. . |
| 4,853,167 | 8/1989 | Bard et al. . |
| 4,938,952 | 7/1990 | Kamen et al. . |
| 4,978,390 | 12/1990 | Snedeker . |
| 5,066,486 | 11/1991 | Kamen et al. . |
| 5,093,110 | 3/1992 | Kamen et al. . |
| 5,158,606 | 10/1992 | Carlick et al. . |
| 5,240,110 | 8/1993 | Reichenbach et al. . |
| 5,244,942 | 9/1993 | Hover et al. ........................ 523/171 |
| 5,306,739 | 4/1994 | Lucey ..................................... 522/42 |
| 5,318,622 | 6/1994 | Kitazawa et al. . |
| 5,322,220 | 6/1994 | Rehkemper . |
| 5,336,307 | 8/1994 | Horvat et al. . |
| 5,345,254 | 9/1994 | Wong et al. . |
| 5,346,540 | 9/1994 | Schlennert . |
| 5,389,717 | 2/1995 | Santini et al. ....................... 524/575 |

(List continued on next page.)

FOREIGN PATENT DOCUMENTS

| | | |
|---|---|---|
| 9710122 | 7/1997 | (AU) . |
| 8705426 | 4/1989 | (BR) . |
| 1933793 | 1/1971 | (DE) . |
| 2419115 | 10/1975 | (DE) . |

(List continued on next page.)

OTHER PUBLICATIONS

File WPI, Derwent accession no. 1990–085886, Tombow Pencil Co: "Coloured lead of pencil and crayon—contain thermoplastic resin, lubricant, pigment and porous inorganic filler"; JP 2036281, 19900206 (Feb. 6, 1990).
Patent Abstracts of Japan, abstract of JP 56–100874 A (Mitsubishi Pencil Co. Ltd.), Aug. 13, 1981.
Patent Abstracts of Japan, vol. 14, No. 192 C–711, abstract of JP 2–36281A (Tonbo Enpitsu K.K.), Feb. 6, 1990.
Patent Abstracts of Japan, vol. 8, No. 122, C–227, abstract of JP 59–33370A (Dainippon Ink Kagaku Kogyo K.K.), Feb. 23, 1984.
English Translation of JP 55025368, Feb. 1980.*
English Translation of JP 03153778, Oct. 1989.*

*Primary Examiner*—Vasu Jagannathan
*Assistant Examiner*—Callie E. Shosho
(74) *Attorney, Agent, or Firm*—Leydig, Voit & Mayer, Ltd.; John M. Augustyn; Xavier Pillai

(57) ABSTRACT

The present invention provides an erasable colored pencil lead composition comprising a colorant, one or more binder resins, a fibrillatable or fibrillated material, and a filler. The colored pencil lead of the present invention produces marks on paper, which are easily erased by ordinary pencil eraser. The mark made using the composition has a cohesive nature that assists in the removal from paper in sheet or film like sections by the use of an ordinary eraser without smearing or leaving a residue. In a preferred embodiment, the composition is free or substantially free of low melting waxes or wax like materials. Examples of suitable binder resins include high density polyethylene, low density polyethylene, polypropylene, and high melting waxes. Examples of fibrillated or fibrillatable materials include fibrillatable or fibrillated polytetrafluoroethylene and ethylene-vinyl acetate copolymer. The colored pencil lead composition may further include a lubricant. Examples of suitable lubricants include particulate lubricants such as micronized PTFE and non-particulate lubricants such as alkoxylated materials, e.g., polyethylene glycols. The present invention further provides a process for using the colored pencil lead composition. The present invention further provides a process for preparing the colored pencil lead of the present invention.

74 Claims, 4 Drawing Sheets

U.S. PATENT DOCUMENTS

| | | |
|---|---|---|
| 5,407,472 | 4/1995 | Yamamoto . |
| 5,416,156 | 5/1995 | Kamen . |
| 5,417,746 | 5/1995 | Cheng . |
| 5,447,560 | 9/1995 | Vogel .................................. 106/20 A |
| 5,464,470 | 11/1995 | Brachman et al. . |
| 5,531,947 | 7/1996 | Metzger et al. . |
| 5,567,206 | 10/1996 | Jankewitz et al. . |
| 5,582,890 | 12/1996 | Davis et al. ........................... 428/57 |
| 5,591,787 | 1/1997 | Schlennert et al. . |
| 5,591,796 | 1/1997 | Wisniewski et al. . |
| 5,595,589 | 1/1997 | Hoshiba et al. . |
| 5,595,700 | 1/1997 | Kitazawa ............................. 264/211 |
| 5,645,629 | 7/1997 | Kitazawa et al. . |
| 5,716,434 | 2/1998 | Koyama . |
| 5,911,814 * | 6/1999 | Kitazawa et al. ................. 106/31.11 |
| 6,011,084 * | 1/2000 | Leidner et al. ....................... 523/164 |

FOREIGN PATENT DOCUMENTS

| | | |
|---|---|---|
| 2447431 | 4/1976 | (DE) . |
| 2555564 | 9/1976 | (DE) . |
| 2527416 | 12/1976 | (DE) . |
| 2603304 | 8/1977 | (DE) . |
| 2611608 | 9/1977 | (DE) . |
| 008718 | 12/1977 | (DE) . |
| 2724317 | 12/1978 | (DE) . |
| 2001011A | 1/1979 | (DE) . |
| 2728705 | 1/1979 | (DE) . |
| 2729320 | 1/1979 | (DE) . |
| 2812424 | 9/1979 | (DE) . |
| 2815695 | 10/1979 | (DE) . |
| 2819134 | 11/1979 | (DE) . |
| 2822134 | 11/1979 | (DE) . |
| 2826350 | 12/1979 | (DE) . |
| 2850559 | 5/1980 | (DE) . |
| 5848952 | 5/1980 | (DE) . |
| 2906101 | 8/1980 | (DE) . |
| 2929938 | 2/1981 | (DE) . |
| 2932276 | 2/1981 | (DE) . |
| 3030947 | 2/1982 | (DE) . |
| 3042283 | 6/1982 | (DE) . |
| 3046093 | 7/1982 | (DE) . |
| 3125441 | 1/1983 | (DE) . |
| 3237546 | 4/1984 | (DE) . |
| 3237557 | 4/1984 | (DE) . |
| 3301546 | 7/1984 | (DE) . |
| 3317381 | 2/1985 | (DE) . |
| 3323688 | 3/1985 | (DE) . |
| 3401647 | 1/1986 | (DE) . |
| 3421408 | 1/1986 | (DE) . |
| 3527778 | 2/1987 | (DE) . |
| 3530803 | 3/1987 | (DE) . |
| 3538015 | 4/1987 | (DE) . |
| 3600370 | 7/1987 | (DE) . |
| 3642950 | 7/1987 | (DE) . |
| 3727877 | 3/1989 | (DE) . |
| 3835679 | 4/1990 | (DE) . |
| 3840760 | 6/1990 | (DE) . |
| 4102217 | 7/1992 | (DE) . |
| 4200405 | 10/1993 | (DE) . |
| 4237063 | 5/1994 | (DE) . |
| 3837473 | 5/1995 | (DE) . |
| 19502779 | 10/1995 | (DE) . |
| 55226 | 6/1982 | (EP) . |
| 88318 | 9/1983 | (EP) . |
| 505262 | 9/1992 | (EP) . |
| 555673 | 8/1993 | (EP) . |
| 573000 | 12/1993 | (EP) . |
| 756946 | 2/1997 | (EP) . |
| 235 | of 1855 | (GB) . |
| 5005 | of 1892 | (GB) . |
| 11182 | of 1902 | (GB) . |
| 53-000725 | 1/1978 | (JP) . |
| 53-004631 | 1/1978 | (JP) . |
| 53-074921 | 7/1978 | (JP) . |
| 53-074922 | 7/1978 | (JP) . |
| 54-023612 | 8/1979 | (JP) . |
| 54-148623 | 11/1979 | (JP) . |
| 003192 | 1/1980 | (JP) . |
| 55-025368 | 2/1980 | (JP) . |
| 55-029521 | 3/1980 | (JP) . |
| 55-115479 | 9/1980 | (JP) . |
| 55-127473 | 10/1980 | (JP) . |
| 55-127474 | 10/1980 | (JP) . |
| 55-127475 | 10/1980 | (JP) . |
| 55-127476 | 10/1980 | (JP) . |
| 56-013733 * | 3/1981 | (JP) . |
| 55-3192 | 8/1981 | (JP) . |
| 56-109266 | 8/1981 | (JP) . |
| 56-163171 | 12/1981 | (JP) . |
| 56-163172 | 12/1981 | (JP) . |
| 57-083570 | 5/1982 | (JP) . |
| 58-080369 | 5/1983 | (JP) . |
| 58-002369 | 7/1983 | (JP) . |
| 58113274 | 7/1983 | (JP) . |
| 58117266 | 7/1983 | (JP) . |
| 59-117569 | 7/1984 | (JP) . |
| 59-117570 | 7/1984 | (JP) . |
| 59120668 | 7/1984 | (JP) . |
| 60-004097 | 1/1985 | (JP) . |
| 60-118772 | 6/1985 | (JP) . |
| 61-023667 | 2/1986 | (JP) . |
| 61-175093 | 8/1986 | (JP) . |
| 61-252278 | 11/1986 | (JP) . |
| 61-275370 | 12/1986 | (JP) . |
| 61-293275 | 12/1986 | (JP) . |
| 62-027480 | 2/1987 | (JP) . |
| 62-027481 | 2/1987 | (JP) . |
| 62-064876 | 3/1987 | (JP) . |
| 62-025195 | 6/1987 | (JP) . |
| 62-034559 | 7/1987 | (JP) . |
| 62-177081 | 8/1987 | (JP) . |
| 63-001199 | 1/1988 | (JP) . |
| 63-057682 | 3/1988 | (JP) . |
| 63-081180 | 4/1988 | (JP) . |
| 185052 | 7/1988 | (JP) . |
| 63-189481 | 8/1988 | (JP) . |
| 89002154 | 1/1989 | (JP) . |
| 2-36281 | 2/1990 | (JP) . |
| 2038475 | 2/1990 | (JP) . |
| 2060978 | 3/1990 | (JP) . |
| 3106976 | 5/1991 | (JP) . |
| 3139579 | 6/1991 | (JP) . |
| 3153778 | 7/1991 | (JP) . |
| 3153779 | 7/1991 | (JP) . |
| 4164978 | 6/1992 | (JP) . |
| 4236276 | 8/1992 | (JP) . |
| 5039449 | 2/1993 | (JP) . |
| 5230414 | 9/1993 | (JP) . |
| 6136315 | 5/1994 | (JP) . |
| 6192613 | 7/1994 | (JP) . |
| 639909 | 12/1978 | (SU) . |
| 975765 | 11/1982 | (SU) . |

\* cited by examiner

ERASABLE COLORED PENCIL LEAD

CROSS-REFERENCE TO RELATED APPLICATIONS

This is a continuation-in-part of co-pending U.S. patent application Ser. No. 09/197,283, filed on Nov. 20, 1998, which in turn is a continuation-in-part of U.S. patent application Ser. No. 09/105,704, filed Jun. 26, 1998, U.S. Pat. No. 6,011,084. The disclosures of the '283 and '704 applications are incorporated herein in their entireties by reference.

FIELD OF THE INVENTION

The present invention relates generally to colored pencil lead compositions, and in particular to erasable colored pencil lead compositions and a method of making and using such compositions.

BACKGROUND OF THE INVENTION

Although colored lead pencils have provided enjoyment to children and others for a long time, attempts have been made to improve upon the properties of these pencils. The properties that make coloring a pleasant and rewarding experience include smooth laydown of the lead composition, good color intensity of the markings, good break strength, and sufficient lead bending strength. In addition, it is desirable to have colored lead pencils that can produce markings on paper that do not smudge or smear and that are erasable by ordinary pencil erasers.

Common colored pencil leads are made from a blend of a pigment, a binder resin and a filler. Although these colored leads possess excellent writing qualities, their markings cannot be easily erased by ordinary pencil eraser. Attempts have been made to improve the lead properties, particularly the erasability of the lead markings. For example, attempts have been made to improve erasability by educing the pigment content of pencil leads. Although his approach reduces the color contrast between the erased ark and the paper, the color intensity of the original ark has been unsatisfactory.

In another approach to improve erasability of the markings, colored pencil leads have been made by blending a mixture of a pigment, one or more fillers, and a wax such as a low melting wax. Although this approach has improved the erasability of the marking, complete removal of the marking has not been achieved. In addition, the erased region is left with a smeared appearance. It is believed that the wax, which on the one hand helps erasability, on the other hand, also contributes to the incompleteness of erasure and the smearing.

It is believed that the shear forces generated during the act of marking on paper with a colored pencil are sufficient to cause a warming of the wax. This warming provides a degree of fluidity to the wax, and to the lead composition, thereby allowing significant penetration of the pencil lead material into the open spaces between the paper fibers. This results in a significant amount of colored pencil lead material becoming trapped below the surface of the paper. The pencil lead material which has so penetrated into the paper fiber matrix becomes unavailable for abrasion and removal by an eraser.

Additionally, the act of erasure provides further frictional forces which also warm the wax component of the colored pencil lead marks. The act of erasure, therefore, gives a degree of fluidity to the pencil mark already on the paper surface. This leads to further penetration by wax into the open spaces in the paper matrix, thereby making a further amount of the pigment contained within the pencil mark unavailable for mechanical abrasion by an eraser.

Further, the fluid nature of the wax results in a large portion of the pencil mark being moved, in the act of erasure, from one location to another without removal from the paper surface. This relocation of the material is generally known as smearing. Repeated use of an eraser on the colored pencil mark continues to smear and drive the pencil mark into the paper fiber matrix until substantially all of the available colored pencil material has been deposited in the open spaces of the paper matrix. At such a point, further attempts at erasure produce substantially no change in the colored pencil mark.

Attempts have been made to prepare colored lead pencils to eliminate the smearing and erasure residue. For example, in one approach, the wax content of the lead has been reduced. Unfortunately, this approach makes the lead very hard. The laydown characteristics of the lead becomes affected and the lead does not write well. In yet another approach, the use of a low melting substance such as an oil has been attempted. Colored pencil leads have been made by blending a pigment, a binder resin, a filler, and an oil. This approach is not easily practicable in commerce because either it increases the manufacturing cost or it affects certain other qualities of the lead. For example, if the lead is produced in a wet forming process, the wet lead should be dried at a temperature that is lower than the melting or flowing temperature of the oil. This increases the lead dry time, and consequently, reduces manufacturing productivity. The oil also tends to seep or migrate out of the lead. This could lead to loss of lead strength as well as failure to produce a mark of appropriate color strength. Further, the oil tends to bleed through the paper, thereby further affecting the quality of the coloring. To alleviate some of the drawbacks associated with the use of an oil, complex manufacturing processes have been proposed which unfortunately can increase the number of manufacturing steps and the pencil manufacturing cost. Common colored pencil leads containing a low melting wax or oil produce marks which tend to smudge when contacted with objects such as finger, paper, and blending stump.

Thus, there exists a need for a colored pencil lead having improved erasability. There further exists a need for colored pencil leads which do not smear when erased by an ordinary pencil eraser. There further exists a need for colored pencil leads which do not smudge when rubbed with a finger, blending stump, or other objects. There further exists a need for a colored pencil lead that has smooth laydown, good color strength, adequate bending strength, and adequate break strength.

These and other objects and advantages of the present invention, as well as additional inventive features, will be apparent from the description of the invention provided herein.

SUMMARY OF THE INVENTION

The foregoing needs have been fulfilled to a great extent by the present invention which provides an erasable colored pencil lead composition that forms a mark composed of a cohesive layer of the composition on the surface to be marked. The lead composition comprises a colorant, one or more binder resins, a fibrillatable or fibrillated material, and a filler. In a preferred embodiment, the colored pencil lead composition of the present invention is free or substantially free of low melting waxes, derivatives of such waxes, wax-like materials, and other materials that resist removal from paper fibers. The lead composition may optionally contain a lubricant such as a particulate lubricant, e.g., PTFE or a non-particulate lubricant, e.g., a polar material.

The present invention further provides a method for using an erasable colored pencil lead composition on a surface to be marked comprising applying the lead to the surface to create a mark that forms a cohesive layer of the colored pencil lead composition. The present invention further provides a method for erasing a mark made using the colored pencil lead composition of the present invention.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF EMBODIMENTS

Figure 1:
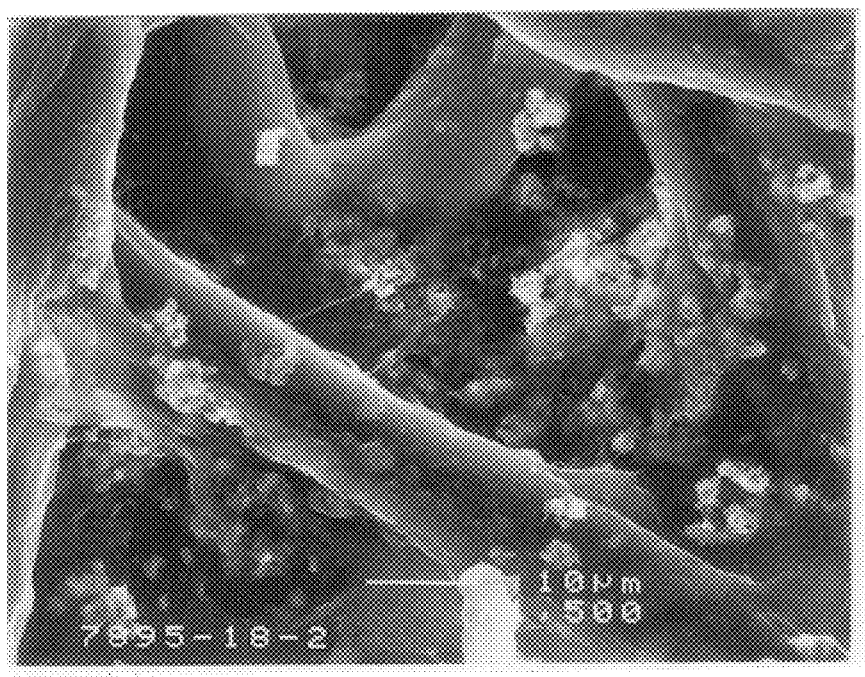
FIG. 1 depicts a Scanning Electron Micrograph (SEM) of the mark made on a 20 lb. weight bond paper by an embodiment of the colored pencil lead composition of the present invention. The magnification was 1,500×. See Example 15 for additional discussion.

The present invention relates to an erasable colored pencil lead composition having improved erasability and reduced smudging and smearing. The colored pencil lead composition also has improved laydown characteristics. The colored pencil lead composition of the present invention forms a mark composed of a cohesive layer of the composition on the marked surface. The lead composition comprises a colorant, one or more binder resins, a fibrillatable or fibrillated material, and a filler. In a preferred embodiment, the colored pencil lead composition of the present invention is free or substantially free of low melting waxes, derivatives of such waxes, wax-like materials, and other materials that resist removal from paper fibers. In a preferred embodiment of the present invention, the composition further includes a lubricant, such as a particulate lubricant or a non-particulate lubricant. The non-particulate lubricant is preferably one that undergoes a phase change and is immiscible with the binder material under processing conditions, e.g., under melt processing conditions.

The lead composition is free or substantially free of wax, derivatives of wax, wax-like materials, for example, stearates, and other materials, which adhere to and resist removal from paper fibers. Wax, derivative of wax, wax-like, or other material herein is defined as a natural or synthetic, aliphatic or other, relatively non-polar compound having a molecular weight below approximately 500, a melting point below about 90° C., and a needle penetration hardness value of greater than about 5 units (or 0.5 mm) @ 100 g/5 sec/25° C.

It is believed that the excellent properties of the colored pencil lead composition are obtained by the following mechanism. The composition has been carefully formulated so that the shear forces generated during the act of marking with the colored pencil on a writing surface produces a strongly colored mark; however, the forces do not cause significant fluidization of the pencil lead material. Thus, the opportunity for the formation of fluidized pencil lead material and its penetration into the substrate such as a matrix of paper fibers have been reduced or eliminated. During the act of marking on a surface of a substrate, a coating of colored lead material is deposited on the surface with minimal penetration into the substrate such as paper fiber matrix.

The colored pencil lead composition of the present invention provides a mark that is highly cohesive. The cohesive nature of pencil lead material helps in resisting smearing when subjected to the mechanical shear forces of erasure and enhances the effectiveness of erasure by detaching from the paper surface in sections such as small sheet or film like sections as opposed to detaching in discrete little pieces or crumbs. The colored pencil lead composition also has low fluid characteristics that allow it to resist penetration of the paper fiber matrix, during both marking and erasure.

Additionally, the colored pencil lead composition as a surface coating resists deformation or stretching during the act of abrasion such as erasing. Thus, the layer of pencil lead material exhibits little smearing during erasure and is capable of complete or near-complete removal by the abrasion of an eraser.

The cohesive nature of the colored pencil lead composition of the present invention is imparted by the inclusion of one or more materials that impart film or sheet forming properties to the pencil material. Thus, the materials included can form a network of fibrils within the layer deposited on the marking surface. Thus, fibrillatable or fibrillated materials such as fibrillatable or fibrillated polymers can be included in the composition. Fibrillatable polytetrafluoroethylene (PTFE) and ethylene-vinyl acetate copolymers (EVA) are examples of polymers which produce the desired fibril network within the colored pencil lead composition when deposited on paper in the normal act of marking. Accordingly, fibrillatable polymers are preferred.

It has been found that mark erasability increases as the proportion of fibrillatable material in the colored pencil lead increases. It is preferable, however, to adjust the content of the fibrillatable material so that the cohesiveness does not become excessive so as to affect the laydown characteristics.

The present invention further provides a method for using the erasable colored pencil lead composition on a surface to be marked comprising:
(a) providing an erasable colored pencil lead composition;
(b) providing the surface; and
(c) applying the lead to the surface to create a mark that forms a cohesive layer of the colored pencil lead composition.

The marks made by the leads are easily erasable using an ordinary pencil eraser without leaving a substantial residue or a smear, and the markings are substantially smudge free when rubbed with other objects it comes in contact with. The colored pencil lead of the present invention provides improved erasability without sacrificing other desirable properties such as smooth laydown, good color strength, reduced tip fraying, and breaking strength.

The colored pencil lead composition contains a suitable colorant—pigment, dye, or combinations thereof. The pigment can be organic or inorganic. Pigments producing special visual effects, for example, pearlescent pigments, can be used. The pigment can be a dry pigment or it can be a dispersion in water, optionally stabilized with surfactants or resins or encapsulated in an organic binder such as a melamine/formaldehyde resin. Examples of pigments stabilized with surfactants include the SUNSPERSE™ brand dispersions, available from Sun Chemical Colors Group in Amelia, Ohio. Examples of resin stabilized pigment dispersions include the FLEXIVERSE™ dispersions which are aqueous based alkali stabilized acrylic dispersions, also available from Sun Chemical Colors Group. Examples of pigments encapsulated in organic binders include RENOL™ pigments which are pigments coated with polyvinyl butyral and available from Clariant Corp. in Charlotte, N.C.

In some embodiments, pigments dispersed in water and stabilized with surfactants are preferred for making the leads of the present invention. A predispersed pigment is relatively easier to incorporate with other ingredients and surfactant-stabilized dispersions generally produce better quality extrudates than resin-stabilized dispersions. It is believed that the resin penetrates the paper and occupies the space between the fibers when the pencil lead is used to mark the paper, and, consequently, causes certain difficulty in erasing the mark.

The pigment can be present in the lead in any suitable amount. The preferred pigment level on a dry volume basis is from about 10% to about 30% of the lead composition, and a more preferred pigment level on a dry volume basis is from about 15% to about 20% of the lead composition.

The binder material provides integrity to the colored pencil lead by bonding the ingredients of the lead together. The binder material generally forms the continuous phase. Any suitable binder material known to those of ordinary skill in the art can be used. The binder material can be thermoplastic polymers such as polyolefins, acrylics, styrenics, PVC, and plasticized PVC, with polyolefins being a preferred class of binder material. Examples of polyolefins include polyethylene and polypropylene. High density polyethylene (HDPE) and low density polyethylene are preferred polyethylene binder resins. A preferred HDPE resin is MICROTHENE™ FA 70000, which is a spherical powder available from Equistar Chemicals Inc. in Houston, Tex. The powder form of polyethylene is particularly preferred. A preferred LDPE resin is MICROTHENE FN 51000, also available from Equistar Chemicals Inc. A preferred polypropylene binder resin is MICROTHENE FP 80000, also available from Equistar Chemicals Inc. Other examples of the binder material include waxes, particularly polyolefin waxes, that have a melting or softening point above about 90°0C., and preferably those having a needle penetration hardness value of less than about 5 units. A preferred polyolefin wax is polyethylene wax. An example of a suitable polyethylene wax is EPOLENE™ E-10, available from Eastman Chemical Corp. in Kingsport, Tenn. EPOLENE E-10 has a needle penetration hardness value of 3 units, a Ring and Ball softening point of 106° C., and a molecular weight of approximately 3,000.

The binder material can be in the form of dry resins, latex or dispersions, or solutions. Examples of latex or dispersions include acrylic dispersions, copolymers of ethylene and acrylic acid (EAA), and copolymers of styrene and butadiene. The ratio of ethylene to acrylic acid can vary from about 1:10 to about 10:1, and preferably 1:1. Examples of polymer solutions include polystyrene dissolved in a solvent such as methyl ethyl ketone, and polyvinyl alcohol dissolved in water.

The binder resin also can be a thermoset. Examples of thermosetting polymers include unsaturated polyesters, vinyl esters, and epoxy resins.

The binder material can be used in any suitable amount. For example, the binder material can be present in an amount of from about 10% to about 60% of the lead composition on a dry volume basis, and preferably in an amount of from about 40% to about 50% of the lead composition on a dry volume basis.

It is particularly preferred, in certain embodiments, that a combination of HDPE and EAA is used as the binder material. This combination provides good laydown and, as a result, the color intensity of the mark is excellent. An example of a suitable EAA is POLYEMULSION™ 540N30, which contains 95% ethylene and 5% acrylic acid, available from Chemcor, in Chester, N.Y. The ratio of polyethylene to EAA can range from about 1:0 to about 0:1, and preferably from about 1:0.3 to about 1:0.05.

In certain other embodiments, it is preferable to use a combination of polypropylene, LDPE, and a high melting polyethylene wax as the binder material. This combination can include the three components in any suitable ratio, preferably in a volume ratio of about 5–20: about 0.5–2: about 2–8; more preferably in a volume ratio of about 10: about 1: about 4; and even more preferably in a volume ratio of 10:1:4; respectively.

The colored pencil lead-of the present invention can include any suitable filler. The role of the filler is to provide stiffness and strength to the lead. Examples of suitable fillers include talc, silica, calcium carbonate, mica, wollastonite, and clay. The fillers can have any suitable geometry. Plate-like fillers such as talcs and micas are particularly preferred for the reasons that they have a soft consistency and the particle edges can promote abrasion of the lead to provide smooth laydown. The fillers may optionally have a surface treatment to improve dispersibility and/or adhesion to the binder material. The particle size of the filler is from less than about 1 $\mu$m to about 50 $\mu$m, and preferably from about 10 $\mu$m to about 30 $\mu$m. The lead composition can contain the filler in any suitable amount, for example, in an amount of from about 10% to about 60%, and preferably from about 20% to about 40% on a dry volume basis of the lead composition.

The lead composition of the present invention includes a fibrillatable or fibrillated material. Preferably, the material is a fibrillatable. Fibrillatable polymers are those which form fibers when subjected to shear forces, for example, during writing. In some instances, fibrillation may occur during lead fabrication process. Any suitable fibrillatable or fibrillated material can be employed to prepare the composition of the present invention. It has been found that the presence of small diameter fibrils, particularly, those having a diameter of from about 0.1 to about 5 $\mu$m, and preferably from about 0.05 to about 0.5 $\mu$m, imparts excellent erasability to the lead. Preferably, a fibrillatable polymer is employed. The fibrillatable polymer can be a homopolymer or copolymer. Examples of fibrillatable polymers includes polyolefins, preferably PTFE, polyethylene, and polypropylene. PTFE is a particularly preferred fibrillatable polymer. Examples of fibrillatable copolymers include ethylene-vinyl acetate copolymers. An example of an ethylene-vinyl acetate copolymer is MICROTHENE MU 76000, available from Equistar Chemicals Inc.

Examples of other fibrillatable or fibrillated polymer includes aliphatic and aromatic polyamides such as nylons and KEVLAR™, polyimides, and polyesters. The fibrils can be incorporated by starting with the material already in fibril form and dispersing them with the other ingredients, or producing them in situ by starting with a fibrillatable polymer, which could be in the form of a latex, suspension, or dry powder. An example of a preferred fibrillatable PTFE is the FLUON™ AD-1 emulsion available from ICI Fluoropolymers in Wilmington, Del. This emulsion is made of PTFE particles of 0.25 $\mu$m and contains 59–62% solids. The emulsion form allows easy blending of the PTFE with other ingredients of the lead composition.

The fibrillated or fibrillatable material can be used in any suitable amount. For example, in certain embodiments of the present invention, where a polyolefin resin such as PTFE is used, it can be used in an amount of from about 0.4% to about 10% of the lead composition on a dry volume basis, and preferably in an amount of from about 1.5% to about 3% of the lead composition on a dry volume basis.

In certain other embodiments, for example, where a copolymer such as ethylene-vinyl acetate is used as the fibrillatable or fibrillated material, it can be used in an amount of from about 1% to about 15% of the lead composition on a dry volume basis, preferably in an amount of from about 2% to about 12% of the lead composition on a dry volume basis, and more preferably in an amount of from about 4% to about 10% of the lead composition on a dry volume basis.

The colored pencil lead of the present invention may contain a lubricant. In certain embodiments, the lubricant is a non-fibrillatable particulate lubricant. This material remains as a particulate during the melt extrusion or wet processing step.

Furthermore, the lubricant is believed to improve the laydown property of the lead. The lubricant also improves erasability because it does not adhere or minimally adheres to the paper fibers. Any suitable lubricant can be used. A preferred lubricant is micronized PTFE powder, which can be produced by grinding sintered PTFE to particles of size about 1 $\mu$m to about 20 $\mu$m. An example of a suitable micronized PTFE powder is SST-2 SP5™ available from Shamrock Technologies, Inc. in Newark, N.J. Micronized PTFE is particularly advantageous since it does not adhere to the paper fibers. Further, micronized PTFE is white and thus does not compromise the color quality of the colored pencil lead.

The non-fibrillatable particulate lubricant can be used in any suitable amount, for example, in an amount of from about 5% to about 50% of the lead composition on a dry volume basis, and preferably in an amount of from about 10% to about 30% of the lead composition on a dry volume basis. When the amount of the lubricant falls below 5% by volume of the lead composition, the lead tends to be too soft and to fray excessively at the tip.

In certain other embodiments, the lead composition of the present invention may contain a non-fibrillatable non-particulate lubricant. This lubricant undergoes a phase change, such as melting, during the lead manufacturing process. The lubricant preferably forms a discontinuous phase while the binder material forms the continuous phase. The lubricant forms domains distributed within the continuous phase. Alternatively or in addition, the lubricant forms separate domains from the binder resin. Any suitable non-fibrillatable non-particulate lubricant can be used. Preferably, the non-fibrillatable non-particulate lubricant is a polar material, particularly when a non-polar binder material, such as, e.g., polypropylene or polyethylene, is used. The polar material is preferably a polar polymer.

Examples of polar materials which can be used as non-particulate lubricant include alkoxylated materials. The alkoxylated materials can include one or more alkoxy groups or, as polymers, can have any suitable degree of polymerization of the alkoxy repeat unit, e.g., up to 100,000, preferably from about 1 to about 1000, and more preferably from about 1 to about 500. Examples of alkoxylated materials include alkoxylated ethers, alkoxylated lanolin, alkoxylated lanolin alcohols, alkoxylates of mono- and polyhydric alcohols, alkoxylated fatty acids, alkoxylated vegetable oils, and alkoxylated hydrogenated vegetable oils. The alkoxy group or repeat unit can have any suitable number of carbon atoms, e.g., from 1 to about 6 carbon atoms, preferably from 1 to about 3 carbon atoms, and more preferably 2 carbon atoms.

Thus, ethoxylated materials are particularly preferred. Examples of ethoxylated materials include ethoxylated ethers, ethoxylated lanolin, ethoxylated lanolin alcohols, ethoxylates of mono- and polyhydric alcohols, ethoxylated fatty acids, ethoxylated vegetable oils, and ethoxylated hydrogenated vegetable oils.

Additional examples of alkoxylated materials include polyalkylene glycols, particularly, polyethylene glycol. A suitable polyethylene glycol is PEG 20M, available from Union Carbide Corp. in Danbury, Conn. This polymer has a molecular weight of approximately 20,000 and is crystalline.

The non-particulate lubricant can be present in an amount of up to about 30%, preferably in an amount of from about 2% to about 20%, and more preferably in an amount of from about 5% to about 15%, on a dry volume basis of the lead composition.

The volume ratio of the non-fibrillatable particulate lubricant to the fibrillated or fibrillatable material can range from about 1:0.01 to about 1:1, and preferably from about 1:0.1 to about 1:0.4. The volume ratio of the non-fibrillatable non-particulate lubricant to the fibrillated or fibrillatable material can be from about 1:1 to about 4:1, and preferably about 3:2.

The colored pencil lead composition of the present composition may further include an antioxidant. The antioxidant inhibits fading, oxidation, or degradation of the colored pencil lead, particularly during its production or fabrication. Any suitable antioxidant can be used. For example, a phenolic antioxidant can be used. Examples of phenolic antioxidants include IRGAFOS® 168, which is tris(2,4-di-tert-butyl phenyl)phosphite, and IRGANOX® 1010, which is tetrakis(methylene(3,5-di-t-butyl-4-hydroxyhydrocinnamte))methane, both from Ciba Specialty Chemicals. In a preferred embodiment, a mixture of two antioxidants, e.g., a mixture of IRGAFOS 168 and IRGANOS 1010 can be used, preferably in equal amounts.

The antioxidant can be present in the lead composition in any suitable amount, e.g., above about 0.01%, and preferably in an amount of from about 0.05% to about 2.0%, and a more preferably in an amount of from about 0.05% to about 0.2% of the lead composition, on a dry volume basis.

It has been found that the properties of the lead are readily correlated with the volume fraction of each component. For this reason, the amounts of the components have been expressed herein as volume fractions. Those desiring to substitute one or more components with materials having a different density, the volume fraction of that component (and all other components) should be maintained substantially the same as in the original formulation in order to produce a lead with equivalent properties.

The volume fraction can be converted to weight fraction using the following formula:

$$W_{fn} = (V_{fn}) \cdot (V_T) \cdot (D_n / W_T)$$

wherein $W_{fn}$ is the weight fraction, $V_{fn}$ is the volume fraction, and $D_n$ is the density of component n. $W_T$ is the total dry weight and $V_T$ is the total dry volume of the lead composition.

As discussed earlier, the colored pencil lead of the present invention has excellent laydown and erasability. The lead markings do not smudge during normal contact with objects, and they also do not smear when rubbed with an ordinary pencil eraser. The erasability, smudging, and smearing of the markings are further described below. The percentage of colored marking left unremoved on the substrate after the marking is rubbed a given number of times with an ordinary pencil eraser is described as the percent not erased. The amount of marking that extends to an adjacent unmarked area when the marking is rubbed with an ordinary pencil eraser is related to the smear of the marking. The amount of marking that extends to an adjacent unmarked area when the marking is rubbed with an object such as a rod or stump is related to the smudging of the marking.

The erasability, smudging, and smearing properties of a lead can be quantitatively measured by methods known to those skilled in the art, for example, by the use of a spectrophotometer. It is known that color applied to a surface can be defined in terms of a color in a color sphere. The color sphere is defined by the lightness ("L") value, the red/green ("a") value, and the blue/yellow ("b") value. See, for example, Color Measurements Instrument Manual, X-Rite® No. 948–968 (1990). Thus the three values when combined define a color of an object as seen by the human eye. Any given color can then be measured in terms of the "L.a.b." value and expressed in relation to the L.a.b. value of a known reference standard such as a white paper. The difference between the L.a.b. values of the substrate and the standard is expressed as the L.a.b. DE (or delta E) value. This method is generally known in the industry as an ellipsoidal tolerance method.

The amount of smudging can be determined as follows. The $DE_0$ value of a freshly applied marked is obtained and this value is then set to be equal to 100% color intensity. The marking is then rubbed using a stump under a given constantly applied pressure. The rubbing is extended in a controlled manner to an area outside the mark on the substrate. The amount of the mark transferred to the extended area is measured.

The amount of marking left unremoved after a marking is rubbed with an eraser can be measured as follows. The marking is rubbed with an eraser a given number of times under a given constantly applied pressure. The eraser is extended into the adjoining unmarked area. The L.a.b. DE value of the marking left unremoved is measured. The erasability of the marking is then expressed as the percent color remaining after the eraser rubs. The L.a.b. DE value of the extended area also is measured, and this value is correlated with the eraser smudging. The measurements of eraser smear, percent unerased, and the stump smudge rating are further illustrated in the Examples herein.

Thus, the colored pencil marking of the present invention has an eraser unerased mark (percent not erased) rating of about 15% or less; an eraser smear rating of about 30% or less; and/or a stump smudge rating of about 20% or less. The marking preferably has an eraser smear rating of less than about 20%, more preferably a smear rating of less than about 15%, and even more preferably a smear rating of less than about 10%.

The marking preferably has a stump smudge rating of less than about 15%, more preferably a smudge rating of less than about 10%, even more preferably a smudge rating of less than about 6%, yet even more preferably a smudge rating of less than about 3%, and further more preferably a smudge rating of less than about 2%. The marking preferably has an unerased marking rating of less than about 12%, more preferably an unerased marking rating of less than about 10%, and even preferably an unerased marking rating of less than about 6%.

The markings discussed herein are made under conditions that are typically observed during the normal use of colored pencils. Thus, the force (described herein in mass units for ease of understanding) applied to create the markings ranges from 300 g to 600 g. The marking is made at a rate of about 20 feet per minute to about 36 feet per minute with an average rate of about 29 feet per minute. The erasing is performed by erasing with an ordinary pencil eraser, Eberhard Faber, PINK PEARL™ No. 100, under an applied force of 600 g; and the stump smudging is carried out under an applied force of 1200 g. The substrate is a white paper such as White Bond or White Tablet paper, which is a 15 Sub paper having a basis weight of 56.4 g/m², a TAPPI brightness standard rating of 82.0, a Sheffield smoothness standard rating of 300, and an opacity standard rating of 78.

The present invention further provides a process for preparing the colored pencil lead composition of the present invention comprising compounding the colorant, the binder resin or resins, the fibrillatable or fibrillated material, the optional lubricant, the anti-oxidant, and the filler, to obtain a blend and forming the pencil lead from the blend.

The blend of the ingredients can be prepared by any method known to those of ordinary skill in the art. Thus, the compounding can be performed by dry blending, semi-dry blending, or wet blending of the ingredients. Prior to the blending, the ingredients can be reduced to the appropriate particle size to permit ease of handling or feeding through the various processing equipment.

In dry blending, all the ingredients are in a dry state, preferably in powder form. All of the ingredients are charged into a powder blending device such as a V-blender or any other suitable mixer. The powders are blended together to obtain intimate mixing of the ingredients. The mixed powder is then used for manufacturing leads.

In semi-dry blending, a small quantity of water is used in the blending step in order to produce a blend that is in the form of a heavy paste. Water can be added to a dry blend of the powders or alternatively, water can be included along with one or more of the ingredients. For example, the binder resin can be in the form of a dispersion in water such as a dispersion of ethylene-acrylic acid having 30% solids content by weight, a pigment dispersion having a solids content of 55% by weight, or a dispersion of fibrillatable polymer in water such as an aqueous dispersion of fibrillatable PTFE having a solids content of 60% by volume.

Thus, in semi-dry blending, all of the dry ingredients are blended to obtain a homogeneous mixture and then the required amount of water is added to obtain a heavy paste. This paste is either extruded into leads or extruded to form strands which are then pelletized. The pellets are then dried to remove the water, preferably at an elevated temperature to speed up the drying process. The pellets are then used for extrusion of leads.

In wet blending, the blend is in the form of a viscous liquid having the consistency of paint. Wet blending is carried out on dispersing equipment typically used for dispersing solids in liquids such as those used in the preparation of paints, for example, vertical or horizontal mixers and ball or pebble mills.

The wet blending can be performed as follows. The pigment dispersion is charged into a suitable container and the dispersion is mixed at a high speed with a high speed disperser. If necessary, water is added to reduce the viscosity of the dispersion. The binder resins which may be in the form of powder or dispersion, filler, and the non-fibrillatable lubricant are added and the mixing is continued for about 20 minutes. The fibrillatable material, preferably in the form of a dispersion, is then added. The mixing is continued until a smooth blend is obtained. The blend is then dried by any known drying processes, for example, in open trays preferably at an elevated temperature or by spray drying.

The blend prepared as above can be formed into leads by methods known to those of ordinary skill in the art, for example, by melt processing, wet processing, or reactive processing. For methods of plastics processing, see generally, *Kirk-Othmer Encyclopedia of Chemical Technology*, 19, pp. 290–316, $4^{th}$ ed. (1996). In melt processing, the blend is dry-while wet processing requires that the blend is a heavy paste. Reactive processing utilizes reactive binders such as epoxy or unsaturated curable resins such as unsaturated polyester resins.

In melt processing, for example, the leads can be formed by extrusion, compression molding, or calendering. In extrusion, the blend in dry form is charged into an extruder such as a single or twin screw extruder and extruded through a die to form a strand. The die can be of suitable cross-section, circular, square, or any desired cross-section. The strand is cooled to room temperature and then cut into the appropriate length to obtain colored pencil leads.

If the extruder feed material is in the form of a powder the extruder should be equipped with a device in assisting in the feeding of the powder, for example, an auger feeder. The extrusion can be carried out in one step or in two steps. When it is carried out in two steps, a primary extrusion is carried out first to accomplish good mixing and to produce the material in pellet form. The second extrusion is carried out on the pellets to produce the leads.

Compression molding processes use a hydraulically operated press with platens to form the desired part, herein lead, in matching metal molds and to hold the densified molding material in desired shape until the system is cured or cooled sufficiently to permit part removal. Thus, the dry blend is charged into a compression mold which is then heated to soften or melt the binder. The molten material is forced into the grooves of the shape of pencil leads. The leads are removed after cooling.

Calendering is a process employed to produce plastic sheets. See, for example, *Kirk-Othmer Encyclopedia of Chemical Technology*, 19, 309, $4^{th}$ ed. (1996). A calender typically has four heavy, large steel rolls, which are usually assembled in an inverted L configuration. The dry blend is fed to the rolls and calendered to obtain a sheet. The sheet is then slit to form rectangular or square cross-section.

The blends prepared by the wet blending can be processed into leads by extrusion, compression molding, or calendering. In extrusion, the wet mix is fed into an extruder and extruded, at room temperature or at an elevated temperature but preferably below the boiling point of water, through a suitable orifice. The lead formed by this process is cut to the appropriate length and dried. After the drying is complete, the temperature of the leads may be increased to melt the binder and improve the strength of the lead.

In compression molding, the wet mix is charged into a compression mold with matched grooves with the shape representing that of the lead. The platens are closed to compress the mix into the desired lead shape. The platens are opened and the leads removed and dried. After the drying is complete, the temperature of the leads may be increased to melt the binder and improve the strength of the lead.

In calendering, the wet mix is calendered between a stack of rolls to form a sheet. The sheet is then slit to for leads with rectangular or square cross-section.

In reactive processing of the blend, the blend is processed in a manner similar to wet processing except that the lead has to be heated either during or after extrusion to cause the reactive binder to solidify.

Colored lead pencils of the present invention can be fabricated using methods known to those of ordinary skill in the art. For example, the colored pencil lead and the pencil casing can be coextruded; or the colored pencil lead, the casing, and any other outer coating can be coextruded to obtain the colored lead pencil. Alternatively, the colored pencil lead can be assembled by combining a lead and a prefabricated casing. For example, the two halves of a prefabricated casing can be pressed together with the pencil lead to obtain the colored pencil. The casing can be made of any material known to those skilled in the art including wood and plastic materials.

The following illustrative examples further illustrate the present invention but, of course, should not be construed as in any way limiting its scope.

EXAMPLE 1

This Example illustrates the preparation of an embodiment of the colored pencil lead. The ingredients used are set forth herein below. The lead was produced as follows.

The required amount of the pigment dispersion was weighed into a mixing container and the mixer was started. The polyethylene powder was added with mixing. The required amount of talc was then added. A small amount of water was added to reduce the viscosity of the mixture. Micronized PTFE, average particle size 4 $\mu$m, was then added. The fibrillatable PTFE emulsion and the ethylene acrylic acid emulsion were then added. The resulting paste was poured into a drying pan and allowed to dry overnight at 110° C. in an oven. The trays were removed from the oven and allowed to cool to room temperature. The material was removed from the pan and ground to a powder in a blender. The ground material was sorted through a #10 mesh sieve. The powder was then extruded in a ¾ inch, L/D=24/1 extruder (compression ratio of 1.5:1) under the following conditions: die diameter 3 mm; temperature profile: 160° C. (zone 1, feed side), 180° C. (zone 2), 180° C. (zone 3, die side) and 180° C. (die). The screw was operated at 60 RPM.

| Ingredients | Wt.% | Vol.% |
| --- | --- | --- |
| SUNSPERSE RHD 6011 (organic red pigment) | 13.2 | 16.5 |
| FLUO HT (micronized PTFE, Micro Powders, Inc. Tarrytown, New York) | 20.8 | 16.8 |
| FLUON AD-1 (fibrillatable PTFE) | 3.6 | 3.0 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc, Barretts Minerals Inc., South of Dillon, Montana) | 43.0 | 27.3 |
| Total | 100.0 | 100.0 |

The colored pencil lead thus produced made marks with good color intensity and good erasability.

EXAMPLE 2

This Example illustrates the preparation of another embodiment of the colored pencil lead of the present invention. Colored pencil leads were produced following the procedure illustrated in Example 1 except the relative amounts of the micronized PTFE and fibrillatable PTFE were changed. The amounts of the ingredients are set forth herein below.

| Ingredients | Wt.% | Vol.% |
|---|---|---|
| SUNSPERSE RHD 6011 (organic red pigment) | 13.2 | 16.5 |
| FLUO HT (micronized PTFE) | 12.2 | 9.9 |
| FLUON AD-1 (fibrillatable PTFE) | 12.2 | 9.9 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc) | 43.0 | 27.3 |
| Total | 100.0 | 100.0 |

The leads produced marks of medium color intensity and good erasability.

EXAMPLE 3

This Example illustrates the preparation of yet another embodiment of the colored pencil lead of the present invention. Colored pencil leads were produced following the procedure illustrated in Example 1 except that the micronized PTFE particles had a size of 12–20 $\mu$m. The composition had a lower level of surface treated talc. The amounts of the ingredients are set forth herein below.

| Ingredients | Wt.% | Vol.% |
|---|---|---|
| SUNSPERSE RHD 6011 (organic red pigment) | 13.2 | 16.5 |
| SST-2-SP5 (micronized PTFE) | 20.8 | 16.8 |
| FLUON AD-1 (fibrillatable PTFE) | 3.6 | 3.0 |
| HDPE FA 700 (high density polyethylene powder) | 17.9 | 33.5 |
| POLYEMULSION 540N30 (ethylene-acrylic acid copolymer) | 1.5 | 2.9 |
| MICROTUFF AG 609 (surface treated talc) | 43.0 | 27.3 |
| Total | 100.0 | 100.0 |

The leads produced marks with increased color intensity and erasability.

EXAMPLE 4

This Example illustrates the preparation of another embodiment of the colored pencil lead of the present invention. Colored pencil leads were produced following the procedure illustrated in Example 1 except that red iron oxide pigment was used instead of the organic red pigment. Surface treated mica was used instead of surface treated talc. The ethylene acrylic acid emulsion was omitted. The amounts of the ingredients used are set forth herein below.

| Ingredients | Wt.% | Vol.% |
|---|---|---|
| C888-1045F (red iron oxide pigment, Creanova, Inc., Somerset, New jersey) | 53.5 | 19.8 |
| FLUO HT (micronized PTFE) | 24.0 | 20.2 |
| FLUON AD-1 (fibrillatable PTFE) | 4.2 | 3.5 |
| HDPE FA 700 (high density polyethylene powder) | 22.3 | 43.5 |
| Total | 100.0 | 100.0 |

The leads produced marks with good color intensity and erasability.

EXAMPLE 5

This Example illustrates the preparation of another embodiment of the colored pencil lead of the present invention. Colored pencil leads were produced following the procedure illustrated in Example 1 except that the composition included a low density polyethylene, an ethylene-vinylacetate (EVA) copolymer, and an ethylene-acrylic acid copolymer. The amounts of the ingredients are set forth herein below.

| Ingredients | Wt.% | Vol.% |
|---|---|---|
| SUNSPERSE RHD 6011 (organic red pigment) | 10.9 | 13.5 |
| FLUO HT (micronized PTFE) | 21.0 | 16.8 |
| FLUON AD-1 (fibrillatable PTFE) | 3.8 | 3.0 |
| MICROTHENE FN 51000 (low density polyethylene powder, Equistar Chemicals) | 12.3 | 23.5 |
| MICROTHENE FE 53200 (ethylene-vinylacetate copolymer) | 5.4 | 10.0 |
| POLYEMULSION 540N30 (ethylene-acrylic acid copolymer) | 1.5 | 2.9 |
| SILWAX WS (polydimethylsiloxane copolymer, Siltech Corp., Toronto, Canada) | 1.7 | 3.0 |
| MICROTUFF AG 609 (surface treated talc) | 43.4 | 27.3 |
| Total | 100.0 | 100.0 |

The leads produced marks of good color intensity and erasability.

EXAMPLE 6

This Example illustrates the preparation of another embodiment of the colored pencil lead of the present invention. Colored pencil leads were produced following the procedure illustrated in Example 1 except that the composition included a polypropylene and an EVA copolymer. The amounts of the ingredients are set forth herein below.

| Ingredients | Wt.% | Vol.% |
|---|---|---|
| SUNSPERSE RHD 6.011 (organic red pigment) | 13.8 | 15.2 |
| FLUO HT (micronized PTFE) | 21.7 | 15.4 |
| FLUON AD-1 (fibrillatable PTFE) | 1.4 | 1.0 |
| MICROTHENE FP 80000 (polypropylene) | 19.5 | 33.5 |
| MICROTHENE MU 76000 (EVA) | 5.1 | 8.4 |
| PEG 20M (polyethyleneglycol 20,000 MW, Union Carbide Corp., Danbury, Connecticut) | 3.8 | 5.3 |
| SILWAX WD-F (polydimethylsiloxane wax, Siltech Corp.) | 1.8 | 2.9 |
| MICROTUFF AG 609 (Surface treated talc) | 32.9 | 18.4 |
| Total | 100.0 | 100.0 |

The leads produced marks of good color intensity and erasability.

EXAMPLE 7

This Example illustrates the preparation of another embodiment of the colored pencil lead of the present invention. Colored pencil leads were produced following the procedure illustrated in Example 1 except that the composition included a polypropylene and an EVA copolymer, and silica as a filler. The amounts of the ingredients are set forth herein below.

| Ingredients | Wt.% | Vol.% |
| --- | --- | --- |
| SUNSPERSE RHD 6011 (organic red pigment) | 13.6 | 15.4 |
| FLUO HT (micronized PTFE) | 21.5 | 15.7 |
| FLUON AD-1 (fibrillatable PTFE) | 1.9 | 1.4 |
| MICROTHENE FP 80000 (polypropylene) | 16.7 | 29.6 |
| MICROTHENE MU 76000 (EVA) | 5.0 | 8.6 |
| PEG 20M (polyethyleneglycol 20,000 MW) | 3.7 | 5.4 |
| SILWAX WD-F (polydimethylsiloxane wax, Siltech) | 1.8 | 2.9 |
| SYLOID 74 (Silica from Grace-Davison) | 3.1 | 2.5 |
| MICROTUFF AG 609 (Surface treated talc) | 32.5 | 18.6 |
| Total | 100.0 | 100.0 |

The leads produced marks of good color intensity and erasability.

EXAMPLE 8

This Example illustrates the preparation of another embodiment of the colored pencil lead of the present invention. The amounts of the ingredients are set forth herein below. The ingredients were combined and extruded in a twin screw extruder to obtain pencil leads.

| Ingredients | Wt.% | Vol.% |
| --- | --- | --- |
| Pigment Red 210 (organic red pigment) | 13.9 | 15.0 |
| MICROTHENE FP 80000 (polypropylene) | 15.4 | 26.1 |
| MICROTHENE MU 76000 (EVA) | 4.8 | 7.8 |
| MICROTHENE FN 51000 (LDPE) | 1.6 | 2.6 |
| MICROTUFF AG 609 (Surface treated talc) | 50.3 | 27.6 |
| PEG 20M | 7.6 | 10.5 |
| EPOLENE E-10 (high melting wax) | 6.4 | 10.4 |
| Total | 100.0 | 100.0 |

The leads produced marks of good color intensity and erasability.

EXAMPLE 9

This Example illustrates the preparation of another embodiment of the colored pencil lead of the present invention. The amounts of the ingredients are set forth herein below. The leads were produced as in Example 8.

| Ingredients | Wt.% | Vol.% |
| --- | --- | --- |
| Pigment Red 210 (organic red pigment) | 13.6 | 15.0 |
| MICROTHENE FP 80000 (polypropylene) | 15.0 | 26.0 |
| MICROTHENE MU 76000 (EVA) | 3.6 | 6.0 |
| MICROTHENE FN 51000 (LDPE) | 1.5 | 2.6 |
| MICROTUFF AG 609 (Surface treated talc) | 52.6 | 29.5 |
| PEG 20M | 7.5 | 10.5 |
| EPOLENE E-10 (high melting wax) | 6.2 | 10.4 |
| Total | 100.0 | 100.0 |

The leads produced marks of good color intensity and erasability.

EXAMPLE 10

This Example illustrates the preparation of another embodiment of the colored pencil lead of the present invention. The amounts of the ingredients are set forth herein below. The leads were produced as in Example 8.

| Ingredients | Wt.% | Vol.% |
| --- | --- | --- |
| SUNBRITE RED 235-7511 (organic red pigment) | 14.8 | 16.0 |
| MICROTHENE FP 80000 (polypropylene) | 15.6 | 26.1 |
| MICROTHENE MU 76000 (EVA) | 4.8 | 7.8 |
| MICROTHENE FN 51000 (LDPE) | 1.6 | 2.6 |
| MICROTUFF AG 609 (Surface treated talc) | 49.1 | 26.7 |
| PEG 20M | 7.7 | 10.4 |
| EPOLENE E-10 (high melting wax) | 6.4 | 10.4 |
| Total | 100.0 | 100.0 |

The leads produced marks of good color intensity and erasability.

EXAMPLE 11

This Example illustrates a method of measuring the pressure or force with which a marking is made during the normal use of the colored pencils by test subjects including children and adults. This Example further illustrates the measurement of writing angle and writing speed.

The apparatus used to measure the marking pressure comprised a school desk, a load cell, a strip chart recorder, and the necessary load cell control electronics. Thus, a school desk was modified to have an opening on the top of the desk. A 25 lbs. capacity load cell from Omega Engineering was placed under the desk opening so that the pressure sensitive face of the load cell was flush with the top of the desk. The load cell was connected to the strip chart recorder and fitted with appropriate power supply and control electronics. The apparatus was built so that the load cell was hidden from the view of the test subjects in order to eliminate any bias.

A preprinted object, such as a hot air balloon, was removably fixed on the face of the load cell and the test subjects were asked to color the object. The average and the maximum force used during marking was calculated from the strip chart recordings. It was found that the average force applied was 300 grams and the maximum force applied was 600 grams.

A protractor, such as by Skill Tech, or by Mitutoyo/MTI, Model 180-905, Aurora, Ill., was used to measure the writing angle. The average angle of writing was 53 degrees. It was observed that the writing angle did not significantly affect the laydown of the markings. Further, a stopwatch was used to determine the speed of writing. The speed of writing was calculated from the time it takes to cover a known distance between given points of the object, for example, the distance between the lines of the hot air balloon. It was found that the writing speed was from about 20 feet per minute to about 36 feet per minute with an average at 28 feet per minute.

EXAMPLE 12

This Example illustrates a method of producing colored pencil markings under controlled conditions that simulate actual markings made by the test subjects under normal marking conditions. Such simulated markings can be used reproducibly to evaluate the properties of the colored pencil lead including laydown, smudge, smear and erasability of the marking.

A Contecma Writeout Machine Model 611 by Contecma Precision Machinery for Writing Instruments, Contecma SA, P.O. Box/Via agli Orti 20, Viganello-Lugano, Switzerland, normally used for evaluating writing instruments such as felt tipped markers and ball point pens, was used to produce markings of colored pencil leads. A clinometer, Model ANGLE FINDER™ available from Dasco Pro Inc. in Rockford, Ill., was used to measure and adjust the writing angle.

Prior to making each writeout or rubout, the pencils were sharpened using an electric pencil sharpener, which was either a Hunt Boston model, Hunt Manufacturing Co. in Statesville, N.C., or a Panasonic Model KP-33, Matsushita Electric Industrial Co. Ltd., Japan. The pencils were sharpened to a taper angle of about 10–12° (about 5–6° with respect to the longitudinal axis of the pencil), and the cross-sections of the tips were made flat using a jig plate and a file. The jig plate, which is a rectangular stainless steel plate, had a thickness of 0.118 inch and a hole of diameter 0.078 inch. The sharpened pencil tip was placed in the hole and the portion of the pencil lead tip extending out of the hole was removed using a metal file to obtain a pencil with a tip having flat cross-section. This insured to reduce or eliminate any variations in pencil sharpening and to provide a uniform tip diameter at the start of each rubout.

A colored lead pencil was placed in the writing instrument sample holder of the writeout machine. The pencil was held in the vertical position, the verticality being insured by the use of the clinometer, with the writing tip pointing to the paper. Weight pieces totaling to 300 g or 600 g were placed in the pencil holding tube located within the sample holder. The total weight of the weight pieces employed corresponds to the force applied in creating the rubout.

The writeout machine employed rolled paper, although other types such as sheets also can be used by attaching sheet paper with tape. The machine was programmed at the "zigzag" setting to write at a speed of 36 feet per minute in a zigzag manner to create a uniformly colored solid pattern of 30 mm width. At these chosen speeds of paper feed and writing, the colored pencil wrote in a zigzag manner to produce a solid pattern without leaving blank spots. Six rubouts, each 25 feet long, were made from a given colored pencil. The pencil was sharpened and the tip flattened as discussed above prior to the beginning of each rubout run.

EXAMPLE 13

This Example illustrates a method of evaluating the colored pencil leads for smearing, smudging and erasability of the mark.

The L.a.b. values of the rubouts were measured on an X-RITE SP68™ Sphere Spectrophotometer available from X-Rite Inc. in Granville, Mich., using the QA MASTER™ software. The spectrophotometer employed a 10 mm reading head. DE values of the rubouts relative to a white area were obtained from the measured L.a.b. values. The DE value of the unerased rubout was obtained by measuring L.a.b. values at three spots along the width, and the measurements were made at the initial 10 mm length of the rubout. Three such readings were taken on each of the six rubouts and the average of the 18 DE values obtained was taken as $DE_0$, a measure of the laydown of the colored pencil lead.

The rubouts were subjected to rubbing with an eraser to measure the smearing characteristic. A PINK PEARL No. 100 pencil eraser was used to erase the rubout. A constant force of 600 g, as measured on the load cell discussed in Example 11, was applied to erase the rubout. The rubout was erased only a distance equal to one-half its width. As indicated, the width of the rubout was 30 mm. Thus, the rubout was erased to a width of 15 mm. The erased area was a rectangular area, 15 mm long in one direction and 10–20 mm long in the other direction. The eraser stroke started from the midpoint of the rubout measured along the width and continuously extended 15 mm past the edge into the unmarked white area. The eraser was moved in a zigzag fashion, and for each eraser test, 24–36 hand strokes were employed, each stroke involving one forward movement and one backward movement. The eraser crumbs were brushed off after every 6–12 strokes. The L.a.b. values of the erased areas and the extended areas also were measured relative to the white area, and DE values were calculated. An average DE value of at least two erasure tests was obtained. The amount of the rubout not erased and the amount of the rubout smeared into the white area were calculated as follows:

Percent of rubout not removed by the eraser=$(DE_1/DE_0) \times 100$, wherein $DE_3$ is the DE value of the erased area.

Percent eraser smear=$(DE_2/DE_0) \times 100$, wherein $DE_2$ is the DE value at the extended area.

The rubouts prepared as in Example 12 were subjected to a stump smudge test as follows. The tip of a Blending Stump (#8), Product No. 8948, supplied by Art & Drafting Connection in Bethlehem, Penn., which is similar to stumps generally used by artists for blending pastels and pastel type media, was employed to smudge the rubouts. The stump tip had an angle of 15 degrees with respect to the longitudinal axis. A constant pressure of 1200 g, as measured by a load cell, was applied to force the rubout from its midpoint across the width and extending 15 mm into the white area. The tip was sharpened using a 320 grip sand paper when the formulation of the colored pencil changed.

The L.a.b. values of the forced areas and the extended areas also were measured relative to the white area, and the DE values were calculated. An average DE value of at least three such smudge tests was obtained. The smudging was expressed as follows:

Percent smudge=$(DE_3/DE_0) \times 100$, wherein $DE_3$ is the DE value at the extended area.

EXAMPLE 14

This Example illustrates some of the properties of the colored pencil. The eraser smear, percent unerased, and the percent stump smudge illustrated in Example 13 are set forth below along with corresponding data for a commercially available non-erasable colored pencil. The advantages of the colored pencil of the present invention are readily apparent from the data set forth below.

| Formulation of Example No. | Rubout Application Load, Grams | Percent Eraser Smear | Percent Not Erased | Percent Smudge |
|---|---|---|---|---|
| 1 | 600 | 18.9 | 10.0 | 2.5 |
| 1 | 300 | 18.7 | 10.4 | 5.6 |
| 6 | 600 | 9.2 | 7.7 | 2.1 |
| 6 | 300 | 16.1 | 6.0 | 2.2 |
| 5 | 600 | 12.9 | 9.1 | 0.8 |
| 5 | 300 | 20.4 | 6.6 | 2.4 |
| 7 | 600 | 11.0 | 12.0 | 2.0 |
| 8 | 600 | 4.2 | 6.4 | 11.7 |
| 9 | 600 | 2.4 | 11.4 | 8.8 |
| Non-erasable colored pencil | 600 | 45 | 59 | 23 |

The data set forth above illustrate the excellent properties of the colored pencil lead composition of the present invention. The effect of the fibrillatable material, for example, EVA, can be seen by comparing the performance of the compositions of Examples 8 and 9. The EVA content of Example 8 composition was higher than that of Example 9 composition. The data show that by increasing the EVA content, the percent not erased can be decreased.

In addition to being useful for making colored pencil leads, the composition of the present invention may also be made into other useful articles such as refills for mechanical pencils, free standing pencils, crayons, and the like, and paints, and marking systems including those with a marker delivery device.

EXAMPLE 15

Figure 2:
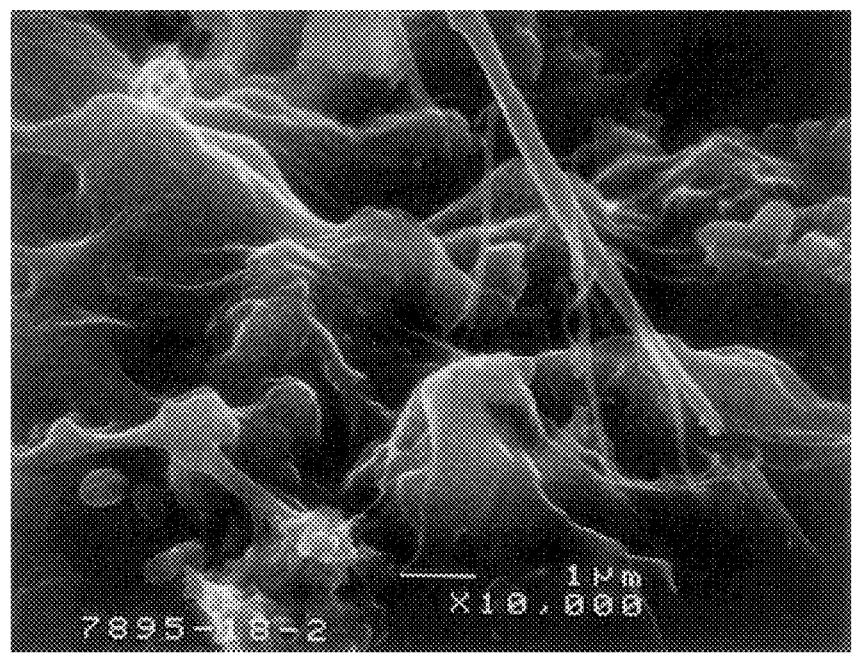
FIG. 2 depicts a SEM of the mark shown in FIG. 1 at a higher magnification. The magnification was 10,000×.
Figure 3:
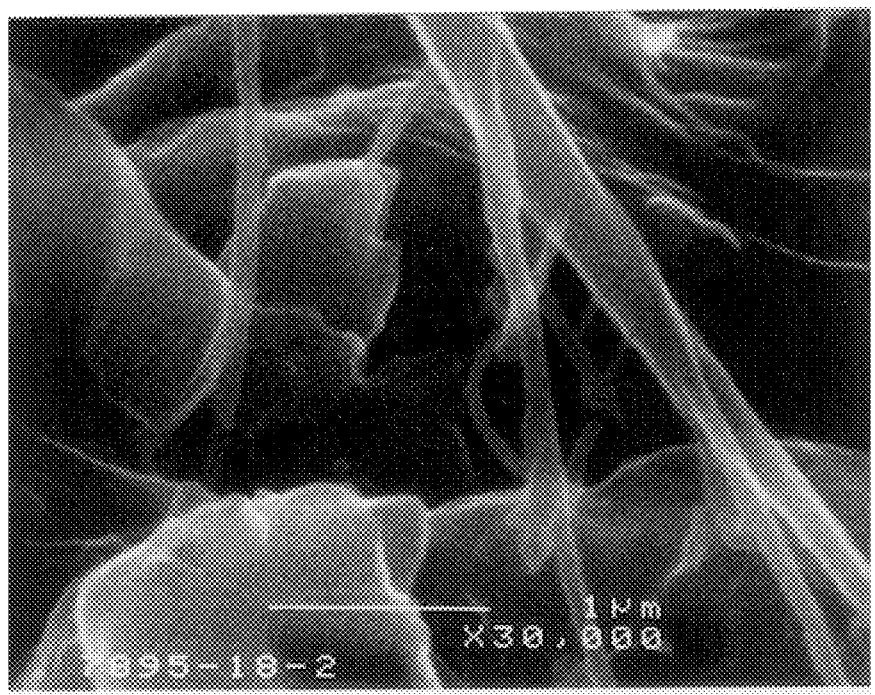
FIG. 3 depicts a SEM of the mark shown in FIG. 2 at a still higher magnification. The magnification was 30,000×.

This Example illustrates the cohesive nature of the mark formed by the colored pencil lead of the present invention. Thus, a mark was made by hand using a pencil containing the lead prepared as in Example 10 under normal writing pressure on a standard 20 lb. white bond paper (photocopying paper). The mark was studied on a Electron Microscope. FIG. 1 depicts a micrograph taken at a magnification of 1,500× and shows the cylindrical shaped fibers of the paper and the lead composition distributed between and adjacent to or on these fibers. Fibrils can be seen particularly in the middle region of the micrograph. It can be seen that the fibrils inter-connect various portions of the mark. The fibrils can be more easily seen in FIGS. 2–3 which depict the micrograph of FIG. 1 at higher magnifications, namely, 10,000× and 30,000×, respectively. It is believed that these EVA fibrils are formed during the writing as a result of the application of shear forces on the composition. When an eraser is applied to the mark, the fibril inter-connected material lifts off the surface as sheet or film-like sections.

EXAMPLE 16

Figure 4:
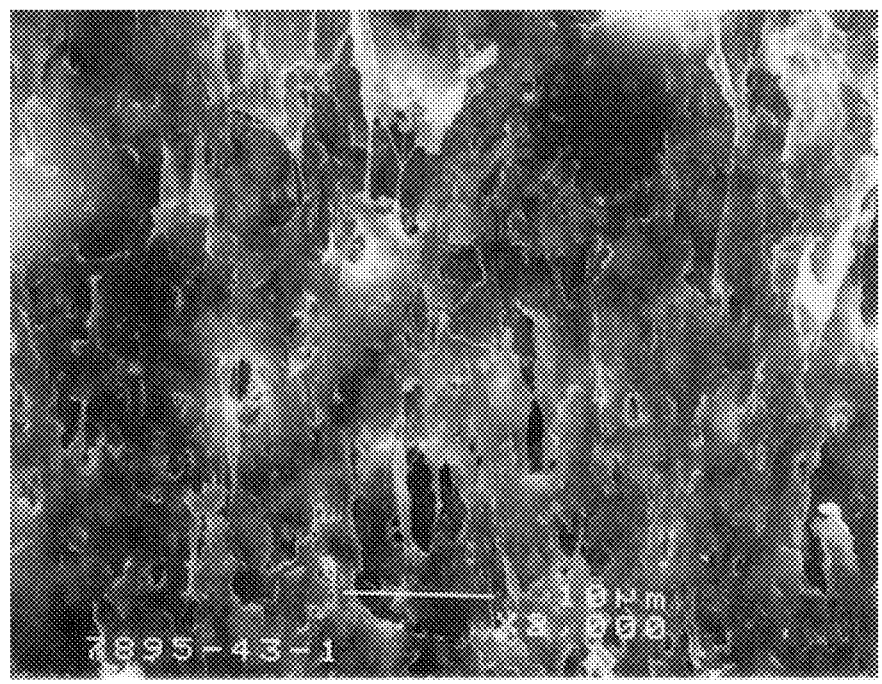
FIG. 4 depicts a SEM of a mark made on a 20 lb. weight bond paper by another embodiment of the colored pencil lead composition of the present invention. The magnification was 2,000×. See Example 16 for additional discussion.
Figure 5:
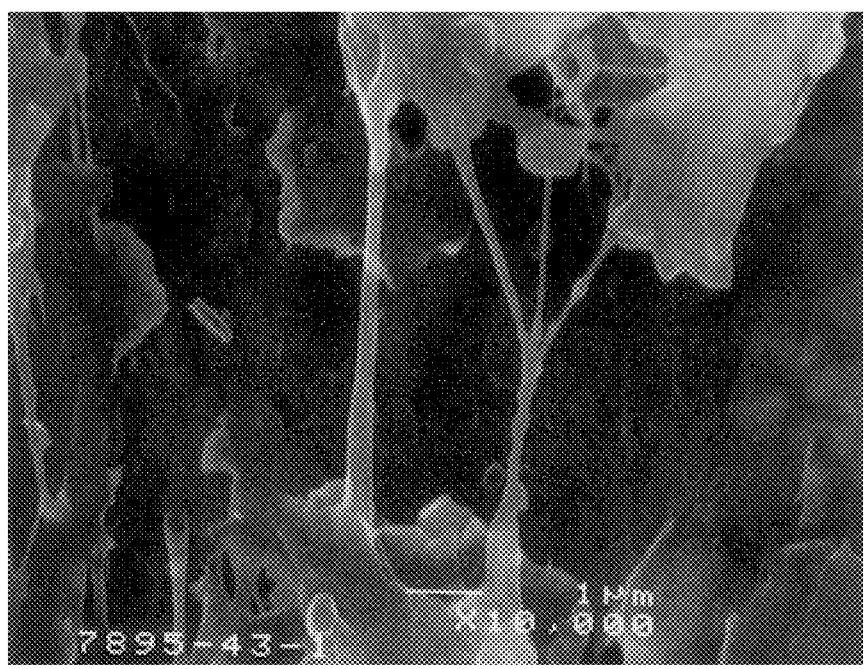
FIG. 5 depicts a SEM of the mark shown in FIG. 4 at a higher magnification. The magnification was 10,000×.

This Example illustrates the cohesive nature of the mark formed by the colored pencil lead of the present invention. Thus, a mark was made by hand using a pencil containing the lead prepared as in Example 8 under normal writing pressure on a standard 20 lb. white bond paper (photocopying paper). The mark was studied on a Scanning Electron Microscope. FIG. 4 depicts a micrograph taken at a magnification of 2,000× and shows the cohesive nature of the lead composition. The fibrils, which are responsible for imparting cohesiveness to the composition, can be seen throughout the micrograph, particularly in the upper middle region. It can be seen that the fibrils inter-connect various portions of the mark. The inter-connecting fibrils can be more readily seen in FIG. 5 which depicts the microstructure at a higher magnification (10,000×), with particular focus on the upper middle region of FIG. 4.

EXAMPLE 17

This Example further illustrates the cohesive nature of the mark formed by the colored pencil lead of the present invention. A lead pencil was fabricated from a lead with the following ingredients.

| Ingredients | Wt.% | Vol.% |
|---|---|---|
| SUNSPERSE RHD 6011 (organic red pigment) | 13.4 | 14.8 |
| MICROTHENE FP 80000 (polypropylene) | 16.4 | 28.4 |
| FLUON AD-1 (fibrillatable PTFE) | 1.0 | 0.7 |
| MICROTHENE MU 76000 (EVA) | 4.5 | 7.5 |
| PEG 20M | 7.0 | 9.8 |
| MICHEM 66930 (high melting wax, m.p. 106° C., Michelman Inc., Cincinnati, OH) | 5.8 | 9.7 |
| MICROTUFF AG 609 (surface treated talc) | 51.9 | 29.1 |
| Total | 100.0 | 100.0 |

Figure 6:
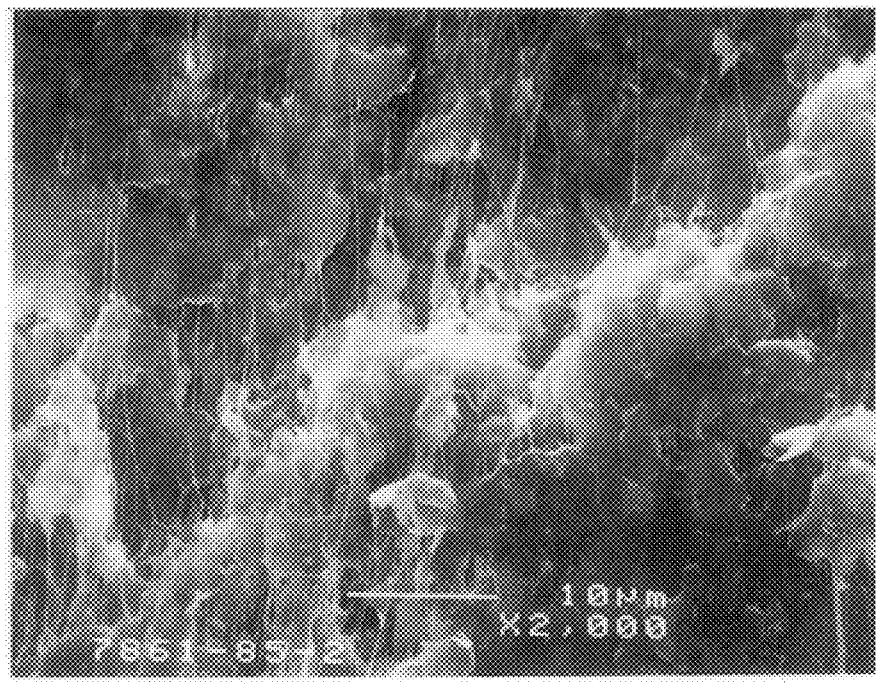
FIG. 6 depicts a SEM of a mark made on a 20 lb. weight bond paper by yet another embodiment of the colored pencil lead composition of the present invention. The magnification was 2,000×. See Example 17 for additional discussion.
Figure 7:
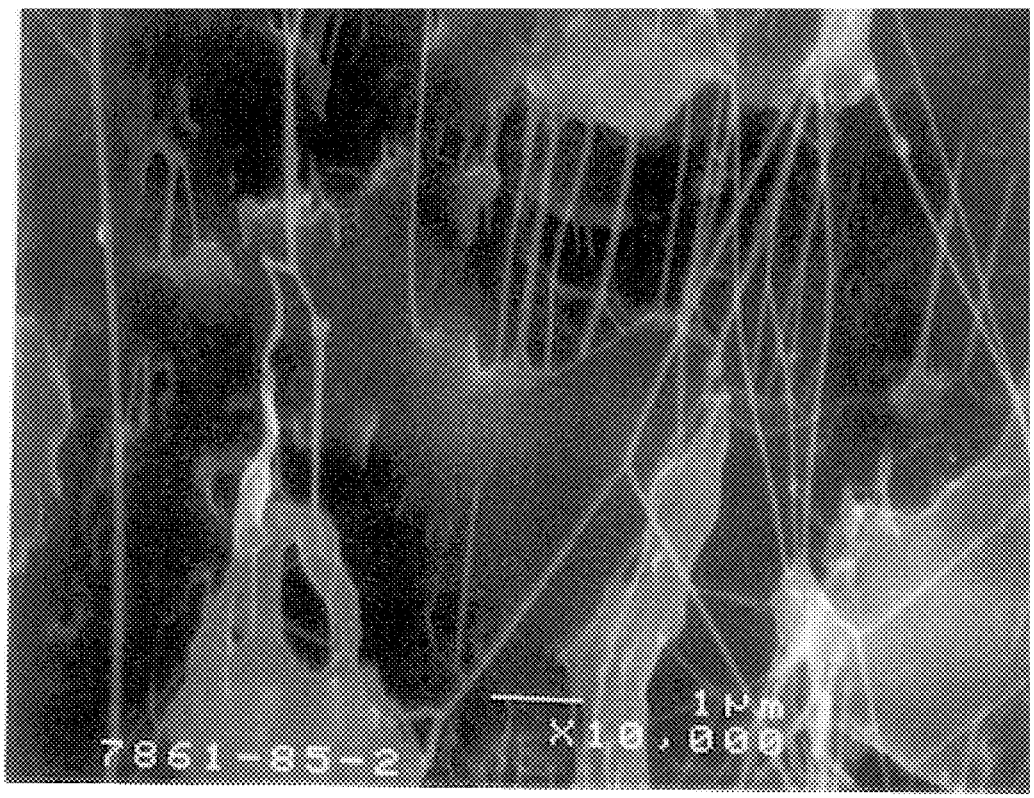
FIG. 7 depicts a SEM of the mark shown in FIG. 6 at a higher magnification. The magnification was 10,000×.

The leads produced marks of good color intensity and erasability. A mark was made by hand using a pencil containing the lead prepared as above under normal writing pressure on a standard 20 lb. white bond paper (photocopying paper). The mark was studied on a Scanning Electron Microscope. FIG. 6 depicts a micrograph taken at a magnification of 2,000× and shows the cohesive nature of the lead composition. The inter-connecting fibrils can be seen throughout the micrograph. The inter-connecting fibrils can be more readily seen in FIG. 7 which depicts the microstructure at a higher magnification (10,000×), with particular focus on the upper middle region of FIG. 6.

EXAMPLE 18

This Example illustrates the preparation of yet another embodiment of the colored pencil lead of the present invention. Colored pencil leads were produced from following ingredients:

| Ingredients | Wt.% | Vol.% |
|---|---|---|
| MONASTRAL RED Y RT-759-D (pigment) | 8.0 | 8.45 |
| IRGAZIN RED DPP BO (pigment) | 4.0 | 3.86 |
| MICROTHENE FP 80000 (polypropylene) | 15.9 | 26.97 |
| MICROTHENE MU 76000 (EVA) | 4.6 | 7.54 |
| MICROTHENE FN 51000 (LDPE) | 1.6 | 2.68 |
| MICROTUFF AGD609 (surface treated talc) | 51.4 | 28.32 |
| PEG 20 M | 7.3 | 10.39 |
| EPOLENE E-10 (high melting wax) | 7.0 | 11.49 |
| IRGAFOS 168 (antioxidant) | 0.1 | 0.15 |
| IRGANOX 1010 (antioxidant) | 0.1 | 0.15 |
|  | 100.0 | 100.0 |

The leads produced marks of good color intensity and erasability.

All references, including patents, patent application, and publications, cited herein are hereby incorporated in their entireties by reference.

While this invention has been described with an emphasis upon several embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. An erasable colored pencil lead composition comprising a colorant, one or more binder resins, a fibrillatable or fibrillated material, a lubricant, a filler, and an antioxidant, wherein the composition is substantially free of low melting waxes or waxy materials having a melting or softening point of about 90° C. or less.

2. The erasable colored pencil lead composition of claim 1, wherein said low melting waxes or waxy materials have a needle penetration hardness value of 5 units or more.

3. The erasable colored pencil lead composition of claim 1, wherein said binder resin is a polyolefin.

4. The erasable colored pencil lead composition of claim 3, wherein said polyolefin is selected from the group consisting of polypropylene, high density polyethylene, low density polyethylene, high melting polyolefin waxes, and combinations thereof.

5. The erasable colored pencil lead composition of claim 4, wherein said polyolefin is combination of a polypropylene, a low density polyethylene, and a high melting polyethylene wax.

6. The erasable colored pencil lead composition of claim 1, wherein said fibrillatable or fibrillated material is a fibrillatable or fibrillated polymer.

7. The erasable colored pencil lead composition of claim 6, wherein said fibrillatable or fibrillated polymer is a fibrillatable or fibrillated copolymer.

8. The erasable colored pencil lead composition of claim 7, wherein said fibrillatable or fibrillated copolymer is a fibrillatable or fibrillated ethylene-vinyl acetate copolymer.

9. The erasable colored pencil lead composition of claim 1, wherein said lubricant is a non-particulate lubricant.

10. The erasable colored pencil lead composition of claim 9, wherein said non-particulate lubricant forms a separate domain from the binder resin.

11. The erasable colored pencil lead composition of claim 10, wherein said non-particulate lubricant is a polar material.

12. The erasable colored pencil lead composition of claim 11, wherein said polar material is an alkoxylated material.

13. The erasable colored pencil lead composition of claim 12, wherein said alkoxylated material is selected from the group consisting of polyalkylene glycols, alkoxylated ethers, alkoxylated lanolin, alkoxylated lanolin alcohols, alkoxylates of mono- and polyhydric alcohols, alkoxylated fatty acids, alkoxylated vegetable oils, alkoxylated hydrogenated vegetable oils, and combinations thereof.

14. The erasable colored pencil lead composition of claim 12, wherein said alkoxylated material is an ethoxylated material.

15. The erasable colored pencil lead composition of claim 14, wherein said ethoxylated material is selected from the group consisting of polyethylene glycols, ethoxylated ethers, ethoxylated lanolin, ethoxylated lanolin alcohols, ethoxylates of mono- and polyhydric alcohols, ethoxylated fatty acids, ethoxylated vegetable oils, ethoxylated hydrogenated vegetable oils, and combinations thereof.

16. The erasable colored pencil lead composition of claim 15, wherein said ethoxylated material is polyethylene glycol.

17. A method of erasing a mark made by an erasable colored pencil lead composition on a surface, the method comprising applying an ordinary pencil eraser to said mark, wherein said mark forms a cohesive layer of a colored pencil lead composition comprising a colorant, one or more binder resins, a fibrillatable or fibrillated material, and a filler, wherein said erasable colored pencil lead composition is substantially free of low melting waxes or waxy materials having a melting or softening point of about 90° C. or less.

18. An erasable colored pencil lead composition comprising a colorant, one or more binder resins, a fibrillatable or fibrillated material, a non-fibrillatable particulate lubricant, and a filler, wherein said erasable colored pencil lead composition is substantially free of low melting waxes or waxy materials having a melting or softening point of about 90° C. or less.

19. The erasable colored pencil lead composition of claim 18, wherein said fibrillatable or fibrillated material is a fibrillatable or fibrillated polymer.

20. The erasable colored pencil lead composition of claim 19, wherein said non-fibrillatable particulate lubricant is a non-fibrillatable particulate polymer.

21. The erasable colored pencil lead composition of claim 20, wherein said non-fibrillatable particulate polymer is polytetrafluoroethylene.

22. The erasable colored pencil lead composition of claim 19, wherein said colorant is present in an amount of from about 10% by volume to about 30% by volume of the composition, said binder resin or resins are present in an amount of from about 30% by volume to about 50% by volume of the composition, said fibrillatable or fibrillated polymer is present in an amount of from about 2% by volume to about 10% by volume, said non-fibrillatable particulate polymer is present in an amount of from about 10% by volume to about 30% by volume of the composition, and said filler is present in an amount of from about 10% by volume to about 30% by volume of the composition.

23. The erasable colored pencil lead composition of claim 18, wherein said colorant is a pigment.

24. The erasable colored pencil lead composition of claim 23, wherein said fibrillatable or fibrillated polymer is polytetrafluoroethylene.

25. The erasable colored pencil lead composition of claim 18, wherein at least one of said binder resins is selected from the group consisting of thermoplastic polymers, thermosetting polymers, and latex polymers.

26. The erasable colored pencil lead composition of claim 25, wherein said binder resin is a thermoplastic polymer.

27. The erasable colored pencil lead composition of claim 26, wherein said thermoplastic polymer is a polyolefin.

28. The erasable colored pencil lead composition of claim 27, wherein said composition includes an olefin homopolymer and an olefin copolymer as binder resins.

29. The erasable colored pencil lead composition of claim 28, wherein said olefin homopolymer is selected from the group consisting of polypropylene and high density polyethylene and said olefin copolymer is an ethylene-acrylic acid copolymer.

30. The erasable colored pencil lead composition of claim 18, wherein said non-fibrillatable polymer and said fibrillatable or fibrillated polymer are present in the composition in an amount of from about 1:0.01 to about 1:1.

31. The erasable colored pencil lead composition of claim 18, wherein said filler is selected from the group consisting of mica, talc, silica, clay, and calcium carbonate.

32. The erasable colored pencil lead composition of claim 18, wherein said erasable colored pencil lead composition is capable of producing on a White Bond paper a second mark having a not erased rating of about 15% or less, wherein said second mark is formed by erasing a first mark produced on said paper under a constant applied force which is in the range of 300–600 g with an ordinary pencil eraser applied to said first mark under a constant applied force of 600 g.

33. The erasable colored pencil lead composition of claim 32, wherein a third mark is formed by erasing said second mark, said third mark having an eraser smear rating of about 30% or less wherein the eraser is extended outside said first mark on the paper to a distance equal to the distance erased on said first mark to create said third mark.

34. The erasable colored pencil lead composition of claim 32, wherein said first mark has a blending stump smudging rate of about 20% or less, wherein said stump is used to rub said first mark under a constant applied force of 1200 g and the stump is extended outside said first mark on the paper to a distance equal to the distance rubbed on the mark.

35. The erasable colored pencil lead composition of any of claims 2, 8, 9, 16, 18, 27, and 32–34, wherein said composition is capable of making a mark that forms a cohesive layer of the composition when applied to a surface.

36. The erasable colored pencil lead composition of claim 32, wherein a third mark is formed by erasing said second mark, said third mark having an eraser smear rating of about 20% or less wherein the eraser is extended outside said first mark on the paper to a distance equal to the distance erased on said first mark to create said third mark.

37. A process for preparing an erasable colored pencil lead comprising a colorant, one or more binder resins, a fibrillatable or fibrillated material, a non-fibrillatable particulate lubricant, and a filler, wherein said erasable colored pencil lead is substantially free of low melting waxes or waxy materials having a melting or softening point of about 90° C. or less, said process comprising blending said colorant, said binder resin or resins, said fibrillatable or fibrillated material, said non-fibrillatable particulate lubricant, and said filler to obtain a blend and forming said pencil lead from said blend.

38. The process of claim 37, wherein said blending is carried out as a dry blending process, semi-dry blending process, or a wet blending process.

39. The process of claim 37, wherein said pencil lead is formed by processing the blend in a melt process, wet process, or reactive process.

40. The process of claim 37, wherein said fibrillatable or fibrillated material is a fibrillatable or fibrillated polymer.

41. The process of claim 37, wherein said non-fibrillatable particulate lubricant is a non-fibrillatable particulate polymer.

42. The process of claim 41, wherein said non-fibrillatable particulate polymer is polytetrafluoroethylene.

43. The process of claim 37, wherein said colored pencil lead includes an antioxidant.

44. An erasable colored pencil lead composition capable of producing on a White Bond paper a second mark having a not erased rating of about 15% or less, wherein said second mark is formed by erasing a first mark produced on said paper under a constant applied force which is in the range of 300–600 g with an ordinary pencil eraser applied to said first mark under a constant applied force of 600 g, wherein the erasable colored pencil lead composition comprises a colorant, one or more binder resins, a fibrillatable or fibrillated material, and a filler, and is substantially free of low melting waxes or waxy materials having a melting or softening point of about 90° C. or less.

45. The erasable colored pencil lead composition of claim 44, wherein a third mark is formed by erasing said second mark, said third mark having an eraser smear rating of about 30% or less wherein the eraser is extended outside said first mark on the paper to a distance equal to the distance erased on said first mark to create said third mark.

46. The erasable colored pencil lead composition of claim 44, wherein said first mark has a blending stump smudging rate of about 20% or less, wherein said blending stump is used to rub said first mark under a constant applied force of 1200 g and the stump is extended outside said first mark on the paper to a distance equal to the distance rubbed on the mark.

47. An erasable colored pencil lead composition comprising a colorant, one or more binder resins, a fibrillatable or fibrillated material, a lubricant, and a filler, wherein the composition is substantially free of low melting waxes or waxy materials having a melting or softening point of about 90° C. or less and a needle penetration hardness value of 5 units or more.

48. The erasable colored pencil lead composition of claim 47, wherein said binder resin comprises a polyolefin.

49. The erasable colored pencil lead composition of claim 48, wherein said polyolefin is selected from the group consisting of polypropylene, high density polyethylene, low density polyethylene, high melting polyolefin waxes, and combinations thereof.

50. The erasable colored pencil lead composition of claim 48, wherein said polyolefin is combination of a polypropylene, a low density polyethylene, and a high melting polyethylene wax.

51. The erasable colored pencil lead composition of claim 47, wherein said fibrillatable or fibrillated material is a fibrillatable or fibrillated polymer.

52. The erasable colored pencil lead composition of claim 51, wherein said fibrillatable or fibrillated polymer is a fibrillatable or fibrillated copolymer.

53. The erasable colored pencil lead composition of claim 52, wherein said fibrillatable or fibrillated copolymer is a fibrillatable or fibrillated ethylene-vinyl acetate copolymer.

54. The erasable colored pencil lead composition of claim 47, wherein said lubricant forms a separate domain from the binder resin.

55. The erasable colored pencil lead composition of claim 54, wherein said lubricant is a polar material.

56. The erasable colored pencil lead composition of claim 55, wherein said polar material comprises an alkoxylated material.

57. The erasable colored pencil lead composition of claim 56, wherein said alkoxylated material is selected from the group consisting of polyalkylene glycols, alkoxylated ethers, alkoxylated lanolin, alkoxylated lanolin alcohols, alkoxylates of mono- and polyhydric alcohols, alkoxylated fatty acids, alkoxylated vegetable oils, alkoxylated hydrogenated vegetable oils, and combinations thereof.

58. The erasable colored pencil lead composition of claim 56, wherein said alkoxylated material comprises an ethoxylated material.

59. The erasable colored pencil lead composition of claim 58, wherein said ethoxylated material is selected from the group consisting of polyethylene glycols, ethoxylated ethers, ethoxylated lanolin, ethoxylated lanolin alcohols, ethoxylates of mono- and polyhydric alcohols, ethoxylated fatty acids, ethoxylated vegetable oils, ethoxylated hydrogenated vegetable oils, and combinations thereof.

60. The erasable colored pencil lead composition of claim 58, wherein said ethoxylated material is polyethylene glycol.

61. An erasable colored pencil lead composition comprising a colorant, one or more binder resins, a fibrillatable or fibrillated material, a non-particulate lubricant, and a filler, wherein the composition is substantially free of low melting waxes or waxy materials having a melting or softening point of about 90° C. or less.

62. The erasable colored pencil lead composition of claim 61, wherein said binder resin comprises a polyolefin.

63. The erasable colored pencil lead composition of claim 62, wherein said polyolefin is selected from the group consisting of polypropylene, high density polyethylene, low density polyethylene, high melting polyolefin waxes, and combinations thereof.

64. The erasable colored pencil lead composition of claim 62, wherein said polyolefin is combination of a polypropylene, a low density polyethylene, and a high melting polyethylene wax.

65. The erasable colored pencil lead composition of claim 61, wherein said fibrillatable or fibrillated material is a fibrillatable or fibrillated polymer.

66. The erasable colored pencil lead composition of claim 65, wherein said fibrillatable or fibrillated polymer is a fibrillatable or fibrillated copolymer.

67. The erasable colored pencil lead composition of claim 66, wherein said fibrillatable or fibrillated copolymer is a fibrillatable or fibrillated ethylene-vinyl acetate copolymer.

68. The erasable colored pencil lead composition of claim 61, wherein said non-particulate lubricant forms a separate domain from the binder resin.

69. The erasable colored pencil lead composition of claim 61, wherein said non-particulate lubricant comprises a polar material.

70. The erasable colored pencil lead composition of claim 69, wherein said polar material comprises an alkoxylated material.

71. The erasable colored pencil lead composition of claim 70, wherein said alkoxylated material is selected from the group consisting of polyalkylene glycols, alkoxylated ethers, alkoxylated lanolin, alkoxylated lanolin alcohols, alkoxylates of mono- and polyhydric alcohols, alkoxylated fatty acids, alkoxylated vegetable oils, alkoxylated hydrogenated vegetable oils, and combinations thereof.

72. The erasable colored pencil lead composition of claim 70, wherein said alkoxylated material comprises an ethoxylated material.

73. The erasable colored pencil lead composition of claim 72, wherein said ethoxylated material is selected from the group consisting of polyethylene glycols, ethoxylated ethers, ethoxylated lanolin, ethoxylated lanolin alcohols, ethoxylates of mono- and polyhydric alcohols, ethoxylated fatty acids, ethoxylated vegetable oils, ethoxylated hydrogenated vegetable oils, and combinations thereof.

74. The erasable colored pencil lead composition of claim 72, wherein said ethoxylated material is polyethylene glycol.

* * * * *

UNITED STATES PATENT AND TRADEMARK OFFICE
CERTIFICATE OF CORRECTION

PATENT NO.     : 6,271,286 B1
DATED          : August 7, 2001
INVENTOR(S)    : Jacob Leidner and David Hacker It is certified that error appears in the above-identified patent and that said Letters Patent is hereby corrected as shown below:

<u>Title page,</u>
Item [56], under "FOREIGN PATENT DOCUMENTS" "2001011A 1/1979 (DE)" should read -- 2001011A 1/1979 (GB) --

<u>Column 1,</u>
Line 37, "educing" should read -- reducing --.
Lines 39 and 41, "ark" should read -- mark --.

<u>Column 19,</u>
Line 39, "a Electron" should read -- a Scanning Electron --.

<u>Column 23,</u>
Line 24, "2,8,9,16,18,27, and 32-34" should read -- 1-16, and 18-34 --.

Signed and Sealed this

Sixteenth Day of July, 2002

Attest:

Attesting Officer

JAMES E. ROGAN
*Director of the United States Patent and Trademark Office*